United States Patent Office 2,704,272
Patented Mar. 15, 1955

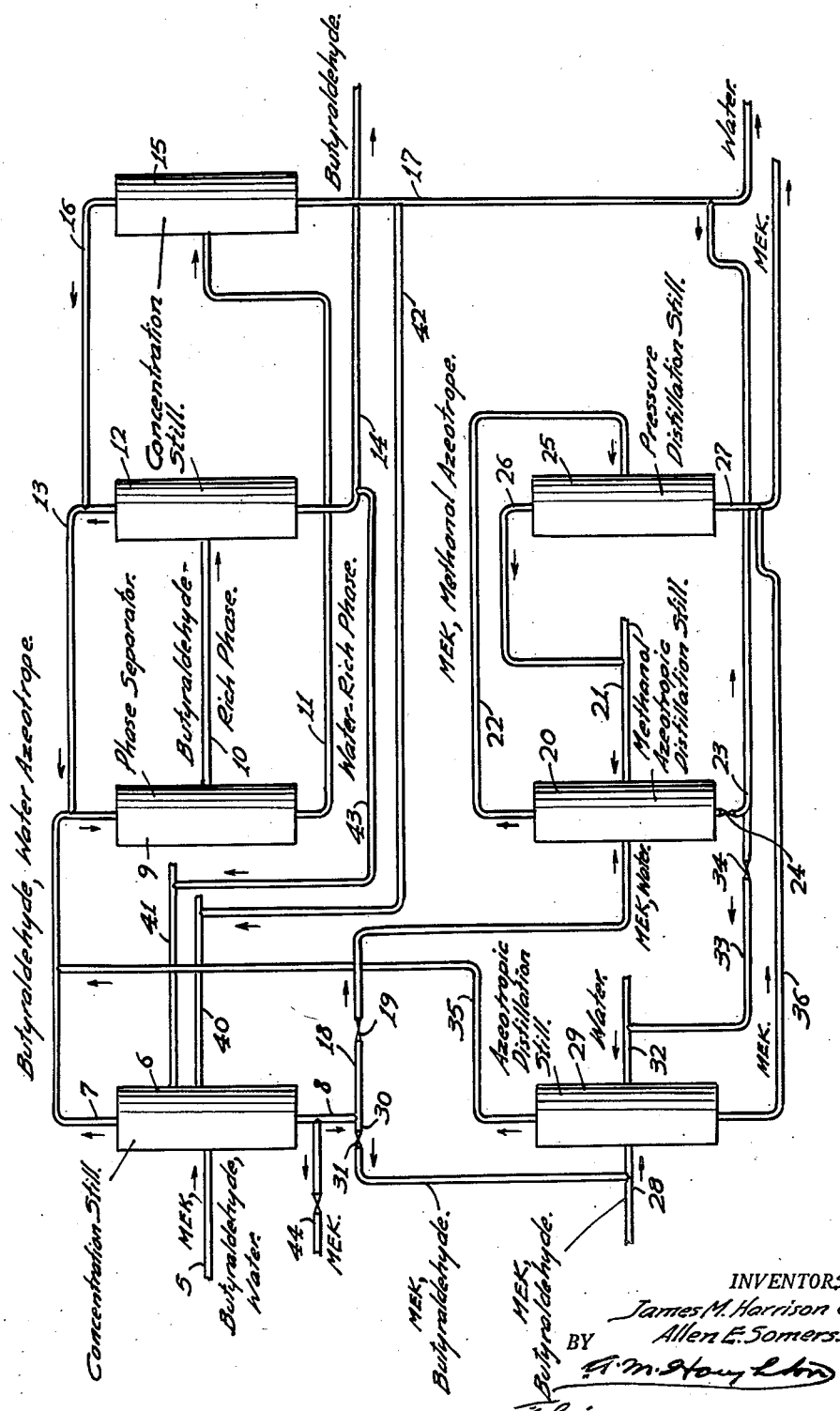

2,704,272

SEPARATION OF ORGANIC MIXTURES

James M. Harrison, Oakmont, and Allen E. Somers, Pittsburgh, Pa., assignors to Gulf Research & Development Company, Pittsburgh, Pa., a corporation of Delaware Application March 14, 1952, Serial No. 276,617

3 Claims. (Cl. 202—42)

This invention relates to a process for the separation of organic compounds and in particular to the separation of an aqueous or nonaqueous mixture of methyl ethyl ketone and butyraldehyde.

A mixture of methyl ethyl ketone and butyraldehyde may be obtained during the separation of a Fischer-Tropsch oxygenated product and it is desirable to further separate the mixture into its components. However, it is difficult to separate methyl ethyl ketone and butyraldehyde because they boil within a very narrow range, butyraldehyde boiling at 75.7° C. at 760 mm. of Hg and methyl ethyl ketone boiling at 79.6° C. at 760 mm. of Hg.

We have found that a mixture of methyl ethyl ketone, butyraldehyde and water can be separated by a process comprising passing the mixture to a distillation zone, and removing overhead an azeotropic mixture containing about 88.0 weight per cent butyraldehyde and about 12 per cent water and having a boiling point of 68.0° C. at 760 mm. of Hg. The azeotropic mixture of butyraldehyde and water removed overhead is passed to a phase separation zone where a butyraldehyde-rich phase and a water-rich phase form, the water-rich phase forming in the lower portion of the separation zone. The butyraldehyde-rich phase is passed to a second distillation zone, butyraldehyde is removed from the bottom of the second distillation zone and is discharged as product while the overhead from the second distillation zone comprising the azeotropic mixture of butyraldehyde and water with a boiling point of 68° C. at 760 mm. of Hg is recycled to the phase separation zone. The water-rich phase is passed to a third distillation zone where it is separated into water as bottoms and an overhead mixture comprising the azeotropic mixture of butyraldehyde and water which is likewise recycled to the phase separation zone.

The bottoms removed from the first distillation zone to which the mixture of methyl ethyl ketone, butyraldehyde and water is charged usually comprise a mixture of methyl ethyl ketone and water; i. e. the water is in excess of the amount necessary to form the azeotrope with the butyraldehyde. The mixture of methyl ethyl ketone and water is preferably separated by passing the mixture to a first bottoms distillation zone, adding methanol as an azeotrope former, removing water as bottoms and removing overhead an azeotropic mixture of methyl ethyl ketone and methanol containing about 68.6 per cent methanol and about 31.4 per cent methyl ethyl ketone and having a boiling point of 63.8° C. at 760 mm. of Hg. The azeotropic mixture of methanol and methyl ethyl ketone is passed to a pressure distillation zone where at a pressure of about 60 pounds per square inch absolute, methanol is removed overhead and is recycled to the first bottoms distillation zone, and methyl ethyl ketone is discharged as bottoms and is removed as product.

In cases where the charge to the first distillation contains an amount of butyraldehyde in excess of the amount required to form an azeotropic mixture with the water present, the bottoms from this zone comprise a mixture of methyl ethyl ketone and butyraldehyde. We have found that a mixture of methyl ethyl ketone and butyraldehyde can be separated by charging the mixture to a distillation zone, adding water as an azeotrope former, removing methyl ethyl ketone as bottoms, removing overhead the azeotropic mixture of butyraldehyde and water having a boiling point of 68.0° C. at 760 mm. of Hg and separating this azeotropic mixture in the manner previously described.

Although the bottoms removed from the first distillation are usually a mixture of methyl ethyl ketone and water, or less frequently a mixture of methyl ethyl ketone and butyraldehyde, the mixture of butyraldehyde, methyl ethyl ketone and water fed to the first distillation zone may contain butyraldehyde and water in azeotropic amounts, thus permitting the removal of substantially pure methyl ethyl ketone as bottoms.

In an embodiment of our invention, of particular importance when a mixture of butyraldehyde, methyl ethyl ketone, and water containing a large amount of methyl ethyl ketone is to be separated, the mixture is fed to a distillation zone, butyraldehyde or water is added in an amount sufficient so that all of the butyraldehyde and water are removed overhead as the azeotrope having a boiling point of 68.0° C. at 760 mm. of Hg and substantially pure methyl ethyl ketone is removed as bottoms.

The process of our invention can best be understood by reference to the accompanying drawing, the single figure of which shows a diagrammatic flow sheet of an apparatus which can be employed for carrying out an embodiment of our invention. In the figure, for the sake of simplicity, flow control equipment such as some of the regulatory valves and other auxiliary equipment known to those skilled in the art has not been shown.

Referring to the figure, a mixture of methyl ethyl ketone, butyraldehyde and water is passed by line 5 to still 6. An azeotropic mixture containing about 88 weight per cent butyraldehyde and about 12 per cent water and having a boiling point of 68.0° C. at 760 mm. of Hg is removed overhead by line 7. A mixture of methyl ethyl ketone and water, a mixture of methyl ethyl ketone and butyraldehyde, or methyl ethyl ketone is removed as bottoms from concentration still 6 by line 8.

The azeotropic mixture of butyraldehyde and water is passed by line 7 into phase separator 9. A butyraldehyde-rich phase is removed from the upper portion of phase separator 9 by line 10 and a water-rich phase is removed from the bottom of phase separator 9 by line 11. The butyraldehyde-rich phase is passed by line 10 to concentration still 12 from which an azeotropic mixture of butyraldehyde and water boiling at 68.0° C. at 760 mm. of Hg is removed overhead by line 13 and butyraldehyde is removed as bottoms by line 14. The water-rich phase from phase separator 9 is passed by line 11 to concentration still 15 from which an azeotropic mixture of butyraldehyde and water of the same composition as the previous azeotropic mixtures of these two compounds is removed overhead by line 16 and water is removed as bottoms by line 17. The azeotropic mixture of butyraldehyde and water in lines 13 and 16 is recycled to the phase separator 9; butyraldehyde and water are discharged as products by lines 14 and 17, respectively.

The bottoms removed from concentration still 6 are usually a mixture of methyl ethyl ketone and water. These are passed by line 8 and line 18 containing valve 19 to azeotropic distillation still 20. Methanol is introduced into azeotropic distillation still 20 by line 21. An azeotropic mixture containing about 31.4 per cent methyl ethyl ketone and about 68.6 per cent methanol and boiling at a temperature of 63.8° C. at 769 mm. of Hg is removed overhead from azeotropic distillation still 20 by line 22, while water is removed as bottoms and is passed through line 23 containing valve 24 to water product line 17. The azeotropic mixture of methyl ethyl ketone and methanol is passed by line 22 to pressure distillation still 25 which is operated at a pressure of about 60 pounds per square inch absolute. Methanol is removed overhead by line 26 and is recycled through line 21 to azeotropic distillation still 20. Methyl ethyl ketone is removed as bottoms from still 25 by line 27 and is discharged as product by this line.

When the bottoms from concentration still 6, the first concentration still, are a mixture of butyraldehyde and methyl ethyl ketone, valve 19 in line 18 is closed and the mixture is passed by line 30 containing valve 31 into line 28 and then into azeotropic distillation still 29. If desired, a mixture of methyl ethyl ketone and butyraldehyde from an outside source can be introduced through line 28. Water is introduced into azeotropic distillation still 29 by line 32. A portion or all of the water may be recycled from water product line 17 by closing valve 24 in line 23 and opening valve 34 in line 33. An azeotropic mixture of butyraldehyde and water containing about 88 per cent butyraldehyde and about 12 per cent water is removed overhead from azeotropic distillation still 29 by line 35 and is passed by line 7 into phase separator 9. Methyl ethyl ketone is removed as bottoms from azeotropic distillation still 29 by line 36 and is discharged as product through this line and methyl ethyl ketone product line 27.

When it is desired to remove methyl ethyl ketone as bottoms from concentration still 6, water is introduced into this still by line 40, or butyraldehyde is introduced by line 41. Water is preferably recycled from line 17 to line 40 by line 42, and butyraldehyde is recycled from line 14 to line 41 by line 43. Methyl ethyl ketone is removed as bottoms by line 8 and valved line 44.

The process of our invention will now be illustrated by means of an example. A mixture of 140 parts methyl ethyl ketone, 100 parts butyraldehyde, and 80 parts water is charged by line 5 into concentration still 6. An azeotropic mixture containing 100 parts of butyraldehyde and 14 parts water boiling at a temperature of 68.0° C. at 760 mm. of Hg is removed overhead from concentration still 6 by line 7. A mixture of 140 parts methyl ethyl ketone and 66 parts of water is removed as bottoms from still 6 by line 8.

A mixture of 310 parts methyl ethyl ketone and 575 parts butyraldehyde is charged to azeotropic distillation still 29 and 78 parts water recycled in the manner described hereinafter are introduced into azeotropic distillation still 29. 310 parts methyl ethyl ketone are removed as bottoms from azeotropic distillation still 29 by line 36 and are discharged as product. An azeotropic mixture containing 575 parts butyraldehyde and 78 parts water and boiling at 68.0° C. at 760 mm. of Hg is passed from still 29 into line 7, where it is mixed with the 100 parts butyraldehyde and 14 parts water from concentration still 6. In addition, 198 parts butyraldehyde and 27 parts water from concentration still 12 and 7 parts butyraldehyde and one part water from concentration still 15, obtained in the manner which will be described, are introduced into line 7. The resulting mixture of 880 parts butyraldehyde and 120 parts water is introduced into phase separator 9. A butyraldehyde-rich phase containing 873 parts butyraldehyde and 27 parts water is passed by line 10 into concentration still 12. 675 parts butyraldehyde are discharged as product through line 14 and an azeotropic mixture containing 198 parts butyraldehyde and 27 parts water and boiling at 68.0° C. at 760 mm. of Hg is passed by lines 13 and 7 to phase separator 9 in the manner pointed out above. A water-rich phase containing 93 parts water and 7 parts butyraldehyde is passed by line 11 into concentration still 15. 92 parts water are removed as bottoms from concentration still 15 and are discharged by line 17. An azeotropic mixture containing 7 parts butyraldehyde and one part water and boiling at 68.0° C. at 760 mm. of Hg is recycled as described previously to phase separator 9.

The bottoms removed from concentration still 6 are a mixture of 140 parts methyl ethyl ketone and 66 parts water. This bottoms mixture is passed by lines 8 and 18 into azeotropic distillation still 20 into which 326 parts methanol recycled as hereinafter described are also introduced. 66 parts of water are removed as bottoms from azeotropic distillation still 20 and are recycled together with 12 parts of water from line 17 to azeotropic distillation still 29. An azeotropic mixture containing 326 parts methanol and 140 parts methyl ethyl ketone and boiling at 63.8° C. at 760 mm. of Hg is removed overhead from azeotropic distillation still 20 by line 22 and is passed into pressure distillation still 25 which is operated at a pressure of about 60 pounds per square inch absolute. 326 parts methanol are removed overhead from pressure distillation still 25 and are recycled by lines 26 and 21 to azeotropic distillation still 29. 140 parts methyl ethyl ketone are removed as bottoms from pressure distillation still 25 and are discharged as such by line 27.

The process of our invention will now be illustrated by means of an example directed to an embodiment in which a mixture of butyraldehyde, methyl ethyl ketone and water is introduced to a concentration distillation zone, and butyraldehyde or water is also added in an amount such that the butyraldehyde and water in the original charge mixture are removed as an azeotrope of butyraldehyde and water having a boiling point of 68.0° C. at 760 mm. of Hg and methyl ethyl ketone is removed as bottoms.

A mixture of 2000 parts of methyl ethyl ketone, 520 parts of butyraldehyde and 96 parts of water is charged by line 5, and 184 parts of butyraldehyde are introduced by line 41, into concentration still 6. 2000 parts of methyl ethyl ketone are removed as bottoms by lines 8 and 44 and are discharged as product. An azeotropic mixture containing 704 parts butyraldehyde and 96 parts water and having a boiling point of 68.0° C. at 760 mm. of Hg is removed overhead from concentration still 6 by line 7. The azeotropic mixture from concentration still 6 is combined with an azeotropic mixture of 206 parts of butyraldehyde and 28 parts water from line 13 and an azeotropic mixture of 7 parts butyraldehyde and 1 part water from line 16. The resulting mixture of 917 parts butyraldehyde and 125 parts water is introduced into phase separator 9. A butyraldehyde-rich phase containing 910 parts of butyraldehyde and 28 parts of water is introduced into concentration still 12 by line 10. An azeotropic mixture of 206 parts butyraldehyde and 28 parts water is passed by line 13 to line 7 and is there combined in the manner described previously. 704 parts of butyraldehyde are removed as bottoms from concentration still 12 by line 14, 520 parts are discharged as product by line 14 and 184 parts are recycled by line 43 and line 41 to concentration still 6. The water-rich phase mixture containing 7 parts of butyraldehyde and 97 parts of water is passed to concentration still 15. An azeotropic mixture containing 7 parts of butyraldehyde and 1 part of water is passed by lines 16, 13 and 7 into phase separator 9 and 96 parts of water are discharged as bottoms by line 17.

The process of our invention can also be applied to an aqueous or non-aqueous mixture of methyl ethyl ketone, butyraldehyde and ethanol. For such an embodiment water, if not already present in such a mixture in the necessary amount, is added in an amount sufficient to form an azeotrope with the butyraldehyde. The resulting mixture is then introduced into a distillation zone and the butyraldehyde is passed overhead in the form of an azeotropic mixture of butyraldehyde and water having a boiling point of 68.0° C. at 760 mm. of Hg. A mixture of methyl ethyl ketone and ethanol is removed as bottoms. If more water is present than necessary to form an azeotrope with butyraldehyde, a mixture of methyl ethyl ketone, ethanol, and water is removed as bottoms.

The azeotropic mixture of butyraldehyde and water can be separated in the manner previously described. The mixture of methyl ethyl ketone, ethanol and water can be separated by passing it to an azeotropic distillation zone, adding methanol as an azeotrope former, removing as bottoms a mixture of ethanol and water and as overhead an azeotropic mixture of methyl ethyl ketone and methanol having a boiling point of 63.8° C. at 760 mm. of Hg and containing about 70 per cent methyl ethyl ketone and about 30 per cent methanol. The mixture of methyl ethyl ketone and methanol can then be separated by pressure distillation.

The boiling points of azeotropic mixtures change with changes in pressure, and for this reason the boiling points of the various azeotropes have been specified at the standard pressure of 760 mm. of Hg. It will be understood that other pressures may be employed for the separation.

Obviously many modifications and variations of the invention as hereinbefore set forth may be made without departing from the spirit and scope thereof; therefore only such limitations should be imposed as are indicated in the appended claims.

We claim:

1. A process which comprises charging to a concentration distillation zone a mixture of methyl ethyl ketone, butyraldehyde and water, said mixture containing butyraldehyde in an amount in excess of that necessary to remove all of the water as an azeotropic mixture of butyraldehyde and water containing about 88 per cent butyraldehyde and about 12 per cent water and having a boiling point of 68.0° C. at 760 mm. of Hg., removing said azeotropic mixture of butyraldehyde and water overhead from said concentration distillation zone, passing said azeotropic mixture of butyraldehyde and water to a phase separation zone to form a butyraldehyde-rich phase in the upper portion of said phase separation zone and a water-rich phase in the lower portion of said phase separation zone, charging said butyraldehyde-rich phase to a second distillation zone, removing butyraldehyde as bottoms from said second distillation zone, and removing as bottoms from said concentration distillation zone a binary mixture of methyl ethyl ketone and butyraldehyde, charging said mixture of methyl ethyl ketone and butyraldehyde to a bottoms azeotropic distillation zone, introducing water as an azeotrope former into said bottoms azeotropic distillation zone, removing methyl ethyl ketone substantially free of water as bottoms from said bottoms azeotropic distillation zone, and removing overhead from said bottoms azeotropic distillation zone said azeotropic mixture of butyraldehyde and water having a boiling point of 68.0° C. at 760 mm. of Hg.

2. A process which comprises charging to a concentration distillation zone a mixture of butyraldehyde, methyl ethyl ketone and water, said mixture containing water in an amount in excess of that necessary to remove all of the butyraldehyde as an azeotropic mixture of butyraldehyde and water containing about 88 per cent butyraldehyde and about 12 per cent water and having a boiling point of 68.0° C. at 760 mm. of Hg, removing an azeotropic mixture of butyraldehyde and water having said boiling point of 68.0 C. at 760 mm. of Hg. overhead from said concentration distillation zone, removing a binary mixture of methyl ethyl ketone and water as bottoms from the first separation zone, charging said mixture of methyl ethyl ketone and water to a first bottoms azeotropic distillation zone, introducing methanol as an azeotrope former to said first bottoms azeotropic distillation zone, removing water as bottoms from said first bottoms azeotropic distillation zone, removing overhead from said first bottoms azeotropic distillation zone an azeotropic mixture of methyl ethyl ketone and methanol, said azeotropic mixture having a boiling point of 63.8° C. at 760 mm. of Hg, passing said azeotropic mixture of methyl ethyl ketone and methanol to a pressure distillation zone, removing methanol overhead from said pressure distillation zone, and removing methyl ethyl ketone as bottoms from said pressure distillation zone.

3. A process which comprises charging a mixture of methyl ethyl ketone and water to an azeotropic distillation zone, introducing methanol as an azeotrope former to said azeotropic distillation zone, removing overhead from said azeotropic distillation zone an azeotropic mixture of methyl ethyl ketone and methanol, said azeotropic mixture containing about 68.6 per cent methanol and about 31.4 per cent methyl ethyl ketone and having a boiling point of 63.8° C. at 760 mm. of Hg and separating said mixture of methyl ethyl ketone and methanol in a pressure distillation zone.

References Cited in the file of this patent

UNITED STATES PATENTS

| | | |
|---|---|---|
| 1,394,232 | Stevens | Oct. 18, 1921 |
| 2,290,636 | Deanesly | July 21, 1942 |
| 2,321,748 | Hopkins et al. | June 15, 1943 |
| 2,607,719 | Eliot et al. | Aug. 19, 1952 |

FOREIGN PATENTS

| | | |
|---|---|---|
| 444,117 | Great Britain | Mar. 16, 1936 |

OTHER REFERENCES

"Distillation," Interscience Publishers, received in Patent Office October 30, 1951; page 366.

Table of Azeotropic Data, Analytical Chemistry, August 1947, vol. 19, pages 510 and 546.